United States Patent
Nakazato et al.

(10) Patent No.: US 8,019,955 B2
(45) Date of Patent: Sep. 13, 2011

(54) INFORMATION PROCESSING APPARATUS AND COMPUTER READABLE MEDIUM

(75) Inventors: Hiroaki Nakazato, Ebina (JP); Sunao Hashimoto, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 809 days.

(21) Appl. No.: 12/025,850

(22) Filed: Feb. 5, 2008

(65) Prior Publication Data

US 2008/0301388 A1     Dec. 4, 2008

(30) Foreign Application Priority Data

May 29, 2007   (JP) .................................. 2007-141580

(51) Int. Cl.
*G06F 12/00* (2006.01)

(52) U.S. Cl. ........ 711/163; 711/159; 711/170; 711/171; 711/173

(58) Field of Classification Search .................. 711/163, 711/159, 170, 171, 173
See application file for complete search history.

(56) References Cited

U.S. PATENT DOCUMENTS

| 6,912,645 | B2 * | 6/2005 | Dorward et al. ............... 711/216 |
| 2002/0040423 | A1 * | 4/2002 | Okaue et al. ................... 711/163 |
| 2006/0149915 | A1 * | 7/2006 | Maly ............................. 711/172 |

FOREIGN PATENT DOCUMENTS

| JP | 2001-51820 A | 2/2001 |
| JP | 2002-207629 A | 7/2002 |

* cited by examiner

*Primary Examiner* — Jae U Yu
(74) *Attorney, Agent, or Firm* — Sughrue Mion, PLLC

(57) ABSTRACT

An information processing apparatus includes a restriction section, an acquisition section and a change section. The restriction section restricts maximum amount of stored data to be stored in each of information storage area in response to a reference value predetermined to each of information storage area. The acquisition section acquires relevant information about the stored data stored in each of the information storage area. The change section that changes the reference value determined to each of the information storage areas based on the acquired relevant information.

15 Claims, 4 Drawing Sheets

FIG. 2

| STORED DATA | TO BE PERMITTED TO ACCESS | ACCESS TYPE |
|---|---|---|
| DOCUMENT FILE F1 | USER U1 | REFERENCE/ UPDATE |
| | USER U2 | REFERENCE |
| | USER GROUP G1 | REFERENCE/ UPDATE |
| DOCUMENT FILE F2 | USER U3 | REFERENCE/ UPDATE |
| ⋮ | ⋮ | ⋮ |

FIG. 3

| STORED DATA | USER | ACCESS TYPE | ACCESS DATE AND TIME |
|---|---|---|---|
| DOCUMENT FILE F1 | USER U1 | CREATE | yyyy/mm/dd hh:mm:ss |
| | USER U2 | DOWNLOAD | yyyy/mm/dd hh:mm:ss |
| | USER U1 | UPDATE | yyyy/mm/dd hh:mm:ss |
| | USER U3 | DOWNLOAD | yyyy/mm/dd hh:mm:ss |
| DOCUMENT FILE F2 | USER U2 | CREATE | yyyy/mm/dd hh:mm:ss |
| ⋮ | ⋮ | ⋮ | ⋮ |

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2007-141580 filed May 29, 2007.

BACKGROUND

1. Technical Field

This invention relates to an information processing apparatus and a computer readable medium.

2. Related Art

Hitherto, to store various pieces of data such as document data in a computer, a data storage area (information storage area) may be allocated to a plurality of users or each user group. Further, in this case, the reference value of the stored data amount (upper limit value, etc.) may be set. Each user can use the data storage area allocated to the user within the range responsive to the reference value of the data amount to store data.

SUMMARY

According to an aspect of the invention, an information processing apparatus includes a restriction section, an acquisition section and a change section. The restriction section restricts maximum amount of stored data to be stored in each of information storage area based on a reference value determined for each of information storage area. The acquisition section acquires relevant information about the stored data stored in each of the information storage area. The change section changes the reference value determined for each of the information storage areas based on the acquired relevant information.

BRIEF DESCRIPTION OF THE DRAWINGS

Exemplary embodiments of the present invention will be described in detail based on the following figures, wherein

FIG. 2 is a schematic representation to show one example of access restriction information;

FIG. 3 is a schematic representation to show one example of access history information.

DETAILED DESCRIPTION

Figure 1:
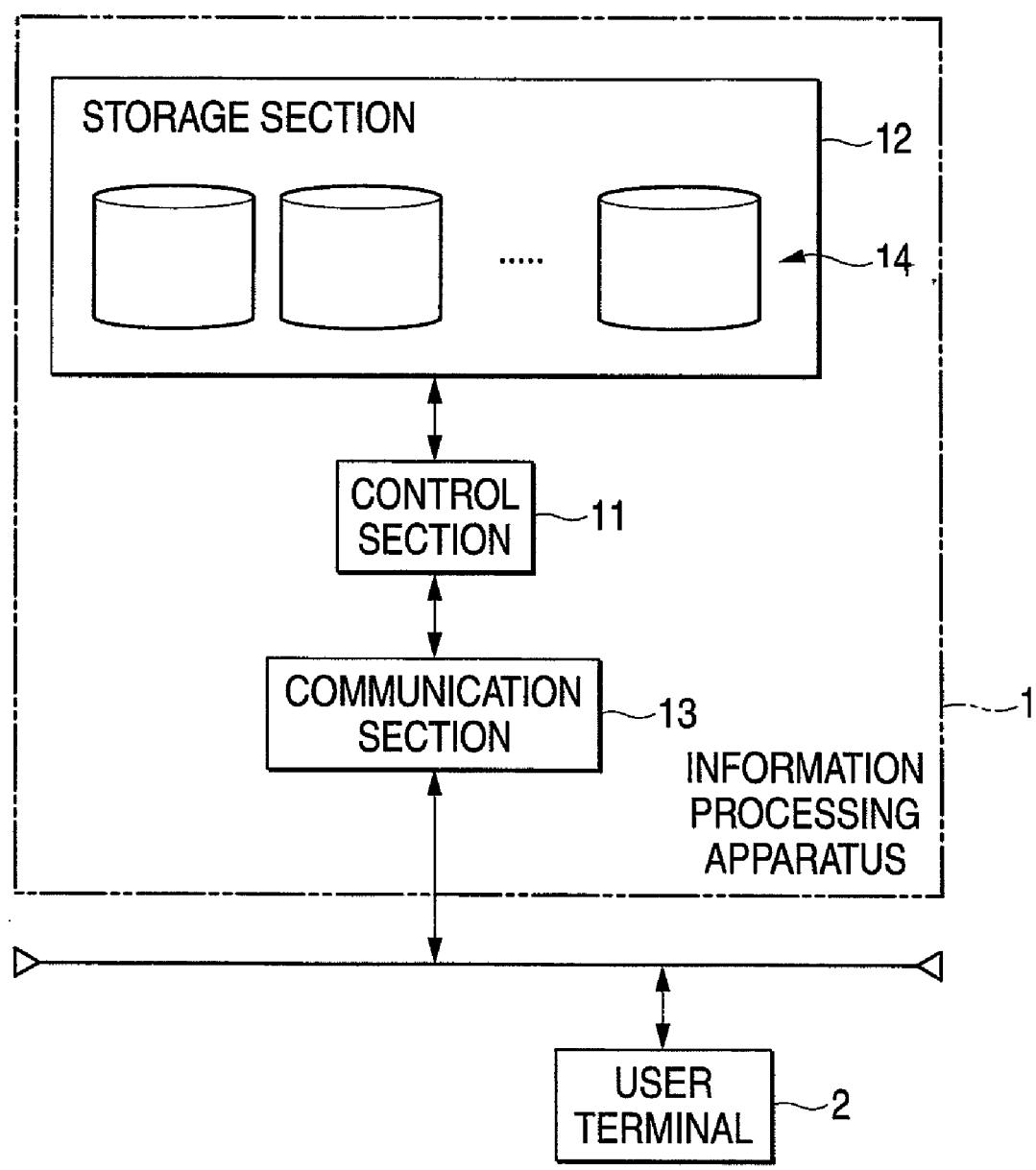
FIG. 1 is a block diagram to represent an example of the schematic configuration of an information processing system including an information processing apparatus according to an embodiment of the invention.

Referring now to the accompanying drawings, there is shown an embodiment of the invention. An information processing system according to the embodiment of the invention is made up of an information processing apparatus 1 and a user terminal 2 which are connected so that they can conduct data communications with each other through communication means of a communication network, etc., for example, as shown in FIG. 1. There may be a plurality of user terminals 2.

The information processing apparatus 1 is a server computer, etc., for example, and is made up of a control section 11, a storage section 12, and a communication section 13.

The control section 11 is a CPU, etc., and operates in accordance with a program stored in the storage section 12. An example of processing executed by the control section 11 is described later.

The storage section 12 is a computer-readable information storage medium including at least either of a memory device of RAM, ROM, etc., and a disk device such as a hard disk, for example. A program executed in the control section 11 is stored in the storage section 12. The storage section 12 also operates as work memory of the control section 11.

Further, in the embodiment, a plurality of data storage areas 14 (information storage areas) are set in the storage section 12. Each of the data storage areas 14 is associated with at least either of the user accessing the information processing apparatus 1 through the user terminal 2 and a user group containing one or more users. For each data storage area 14, a system manager presets the reference value of the data amount of one or more stored data pieces (stored information pieces) to be stored in the data storage area 14. The user associated with each data storage area 14 or the user belonging to the user group associated with each data storage area 14 can store various pieces of data such as a document file in the data storage area 14 within the range of the data amount responsive to the reference value. In the description to follow, it is assumed that N data storage areas 14 are set in the storage section 12 as a specific example.

The communication section 13 is a communication interface of a modem, a LAN card, etc., and transmits information to communication means in accordance with a command from the control section 11. It also accepts information coming through the communication means and outputs the information to the control section 11.

The user terminal 2 is a personal computer, etc., for example, and executes various types of processing based on a command of the user, etc. In the embodiment, the user terminal 2 accesses the data storage area 14 reserved in the information processing apparatus 1 to store data therein or to reference or update the data stored in the data storage area 14 in accordance with a command of the user using the user terminal 2.

Information managed by the information processing apparatus 1 will be discussed. The information processing apparatus 1 retains a list of the users who can access the stored data in each data storage area 14. In this case, the information processing apparatus 1 may associate information indicating the importance of the user for storage as one piece of attribute information to each user. The importance is specified by the system manager in response to the managerial position, the role, etc., of the user, for example. The information processing apparatus 1 also retains a list of the user groups with which one or more users are associated. Information indicating the importance may also be associated with the user group in response to the role, etc., of the user group, etc. Each data storage area 14 is allocated to any of the users or the user groups.

The information processing apparatus 1 also retains information concerning the stored data in each data storage area 14. For example, the information processing apparatus 1 retains information concerning stored data use (access) of the user.

As a specific example, access restriction information is set in each stored data piece. The access restriction information is information concerning the use restriction to restrict the user's use of each stored data piece and is information for determining enable/disable of each of different types of access for each user or user group. Upon reception of an access request of a specific type to any stored data from the user, the information processing apparatus 1 determines whether or not the user is to be permitted to make access of the type based on the access restriction information set about the stored data.

FIG. 2 is a schematic representation to show one example of such access restriction information. In the example in FIG. 2, a user U1 and any user belonging to a user group G1 are permitted to make reference and update access to a document file F1 and a user U2 is permitted to make reference access to the document file F1. A user U3 is permitted to make reference and update access to a document file F2. The users and user groups not explicitly permitted to make access in the access restriction information are not permitted to make access.

The information processing apparatus 1 records information concerning a use history of the user for the stored data in each data storage area 14 (access history information). That is, if the user accesses each stored data from the user terminal 2, information containing the accessed stored data, the accessing user, the access type, the access date and time, etc., is recorded as the access history information. FIG. 3 is a schematic representation to show one example of such access history information.

Figure 4:
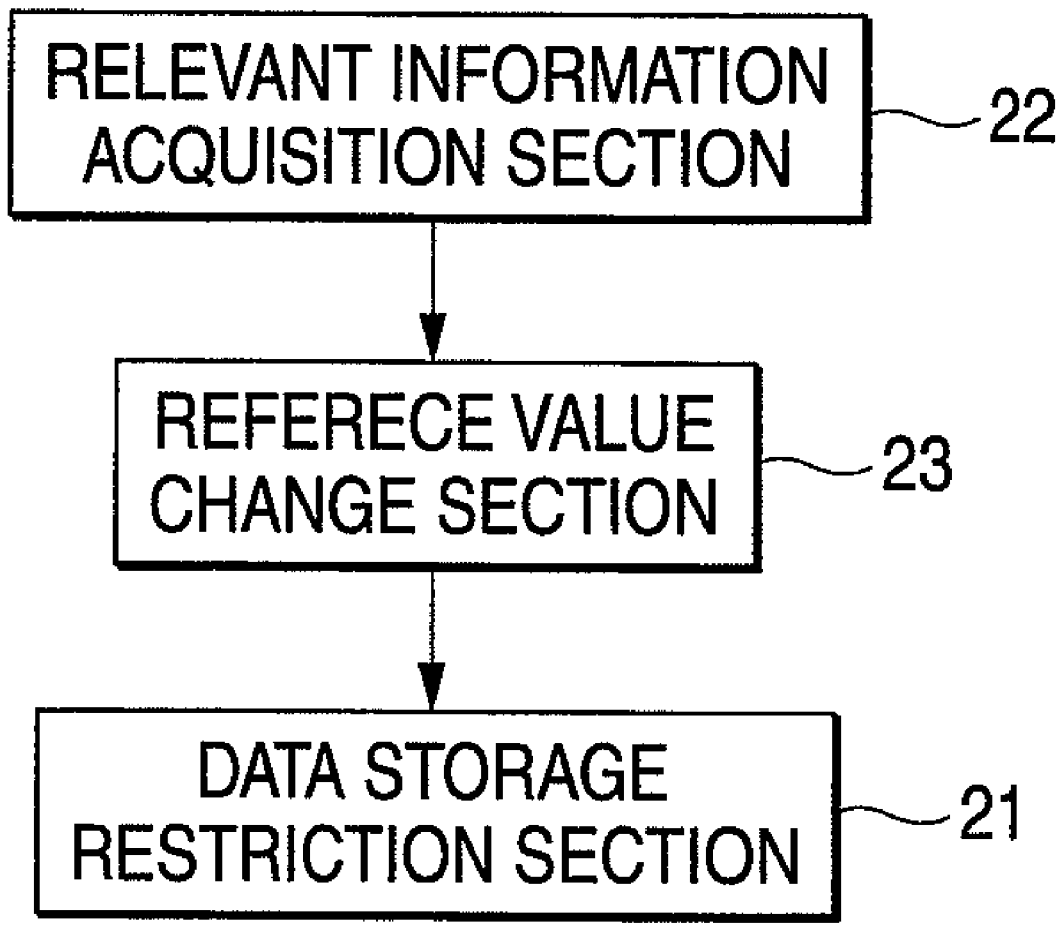
FIG. 4 is a functional block diagram to show a function example of the information processing apparatus according to the embodiment of the invention.

Next, the functions implemented by the information processing apparatus 1 will be discussed. The information processing apparatus 1 includes a data storage restriction section 21, a relevant information acquisition section 22, and a reference value change section 23, for example, as shown in FIG. 4. These functions can be implemented as the control section 11 executes the program stored in the storage section 12, for example. The program may be provided as it is stored on any of various computer readable information storage media of a CD-ROM, a DVD-ROM, etc., for example, or may be provided through communication section of the Internet, etc., for example.

The data storage restriction section 21 executes control for restricting the amount of stored data in each data storage area 14 (total of the data sizes of the stored data) in response to a predetermined reference value about each of the data storage areas 14. Accordingly, the information processing apparatus 1 can restrict the use of the data storage area 14 by the user or the user group associated with each data storage area 14 and can allocate the data amount available in the whole system to each user or user group under a predetermined condition.

As a specific example, if stored data of an amount exceeding the reference value is stored in the data storage area 14, the data storage restriction section 21 restricts to store more data in the data storage area 14. Alternatively, if a request for storing new data in the data storage area 14 is made, the data storage restriction section 21 may determine whether or not the total amount of the stored data in the data storage area 14 will exceed the reference value as the new data is stored and if the data storage restriction section 21 determines that the total amount will exceed the reference value, it may refuse to store the requested new data.

The relevant information acquisition section 22 acquires relevant information to the stored data in each data storage area 14 (stored data relevant information). The stored data relevant information is information concerning the use of each stored data by the user, attribute information set about each stored data, etc., for example. As a specific example, the relevant information acquisition section 22 acquires the access restriction information and the access history information described above as the information concerning the use of each stored data. The stored data relevant information may be information concerning when each stored data was stored in the data storage area 14.

The reference value change section 23 changes the reference value determined about each data storage area 14 based on the stored data relevant information acquired by the relevant information acquisition section 22. After the reference value change section 23 changes the reference value, the data storage restriction section 21 restricts the amount of the data to be stored in each data storage area 14 in response to the changed reference value.

Specifically, for example, the reference value change section 23 calculates an index value used for the reference value change based on the stored data relevant information acquired by the relevant information acquisition section 22 about the stored data in the data storage area 14 for each of the data storage areas 14. In the description to follow, the index value is represented as $Vi$ ($i=1, 2, \ldots, N$) where i is an integer ranging from 1 to N indicating each of the data storage areas 14. The reference value change section 23 calculates amount of the reference value to be changed for each data storage area 14 (which will be hereinafter represented as $Xi$) based on the index value $Vi$.

For example, the reference value change section 23 calculates an average value $Vav$ of the N index values $Vi$ calculated about each data storage area 14. It calculates change amount $Xi$ of the reference value of each data storage area 14 based on the difference between the index value $Vi$ and the average value $Vav$ of the index values as illustrated in the following calculation expression:

$$Xi=K(Vi-Vav)$$

where K denotes a predetermined constant. The change amount $Xi$ is thus calculated, whereby the sum of N change amounts $Xi$ calculated about N data storage areas 14 becomes 0. That is, the reference value of each data storage area 14 is thus changed, so that the sum total of the reference values of all data storage areas 14 remains unchanged before and after reference value change executed by the reference value change section 23.

Several specific examples of index value calculation will be discussed below:

As a first example, the reference value change section 23 calculates the index value based on the access history information acquired by the relevant information acquisition section 22. That is, the total value of the numbers of access times over a past predetermined time period (for example, past three months) to stored data pieces in each data storage area 14 is calculated based on the accessed stored data and the access date and time information contained in the access history information, and is used as the index value of the data storage area 14.

As a second example, the reference value change section 23 calculates the index value based on the information concerning the storage timing acquired by the relevant information acquisition section 22. That is, the number of data pieces stored in the data storage area 14 within a past predetermined time period, of the stored data pieces in each data storage area 14 is used as the index value of the data storage area 14.

As a third example, the reference value change section 23 calculates the index value based on the access restriction information acquired by the relevant information acquisition section 22. For example, the reference value change section 23 determines that if one of the stored data pieces in each data storage area 14 has the access restriction information set about the stored data piece satisfying a predetermined condition, the stored data piece is important data. For each of the data storage areas 14, the number of the stored data pieces determined the important data, stored in the data storage area 14 is used as the index value of the data storage area 14. In this case, the reference value change section 23 may determine that the stored data to which the number of users set to permission of reference and update access in the access restriction information is equal to or less than a predetermined number is important data, for example. The reference value change section 23 may determine that the stored data to which only a specific user or a specific user group is set to permission of reference and update access is important data.

The reference value change section 23 may determine whether or not a predetermined condition is satisfied based on the attribute information of the data type, etc., set about each stored data piece and may use the number of the stored data pieces determined satisfying the predetermined condition as the index value. Further, it may calculate the change amount Xi of the reference value of the data storage area 14 based on the attribute information of the importance, etc., set about the user or the user group associated with each data storage area 14. For example, the reference value change section 23 may calculate the change amount Xi so that the reference value of the data storage area 14 associated with the user or the user group high in the importance becomes larger.

The reference value change section 23 may use several index values described above in combination to calculate the change amount Xi. In this case, for example, the reference value change section 23 calculates the change amount Xi by multiplying each of the different types of index values by a predetermined weighting coefficient. The system manager may be able to specify which index value of the different types of index values is to be used to calculate the change amount of the reference value or how much importance is placed on each index value if the different types of index values are used in combination to calculate the change amount of the reference value.

Alternatively, the reference value change section 23 may determine the change amount of the reference value of each data storage area 14 according to a different method from the calculation methods using the index value described above. For example, the reference value change section 23 selects a data storage area 14 whose reference value is to be increased and a data storage area 14 whose reference value is to be decreased based on the index value calculated about each data storage area 14, such as the number of access times to each stored data piece described above. As a specific example, the reference value change section 23 calculates a score value based on a similar index value to that in the example described above about each data storage area 14, the weighted average of the index values, or the like. It selects a predetermined number of data storage areas 14 in the descending order of the score values as data storage areas whose reference value is to be increased. It selects a predetermined number of data storage areas 14 in the ascending order of the score values as data storage areas whose reference value is to be decreased. Alternatively, the reference value change section 23 may select a data storage area whose reference value is to be increased based on the available space of each data storage area 14 (value resulting from subtracting the total data amount of the stored data in the data storage area 14 from the reference value).

Further, the reference value change section 23 decreases the reference value of each data storage area 14 selected as the data storage area whose reference value is to be decreased and increases the reference value of each data storage area 14 selected as the data storage area whose reference value is to be increased. As a specific example, the reference value change section 23 calculates the change amount (decrease amount) of the reference value based on the available space of each data storage area 14 selected as the data storage area whose reference value is to be decreased. The change amount is calculated according to a predetermined ratio such as 25% of the available space, for example. In response to the calculated decrease amount of the reference value, the change amount (increase amount) of the reference value of the data storage area 14 selected as the data storage area whose reference value is to be increased is determined, for example, so as to increase the reference value by the same amount as the decrease amount.

The reference value change of the reference value change section 23 described above is executed at a predetermined timing. For example, the reference value change section 23 may change the reference value of each data storage area 14 each time a predetermined time has elapsed as task processing previously registered by the system manager.

If the stored data in each data storage area 14 satisfies a predetermined condition, the reference value change section 23 may change the reference value. As a specific example, the reference value change section 23 changes the reference value if the data amount of the stored data in any data storage area 14 exceeds the reference value or exceeds a predetermined ratio to the reference value (for example, 80%). Whenever access satisfying a predetermined condition is made to each stored data piece, the reference value change section 23 may change the reference value. For example, if reference access is made to any stored data piece, the reference value change section 23 may change the reference value of the data storage area 14 storing the stored data piece so as to increase the reference value by a predetermined amount, etc.

The embodiment of the invention is not limited to the specific embodiment described above. For example, in the description given above, the data storage areas 14 are reserved in the information processing apparatus 1, but may be reserved in a storage device, etc., separate from the information processing apparatus 1.

The data storage area 14 need not be an area allocated to each user or user group. For example, more than one data storage area 14 may be associated with one user or one user group in response to the purpose, etc. In such a case, the reference value change section 23 may change the reference values so as to decrease the reference value of one data storage area 14 and increase the reference value of another data storage area 14 among the data storage areas 14 associated with one user.

The reference value change section 23 may exclude a predetermined data storage area 14 from the data storage areas whose reference value is to be changed. For example, the reference value change section 23 may skip changing the reference value of the data storage area 14 associated with the user or user group with the importance satisfying a predetermined condition.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a restriction section that restricts a maximum amount of stored document files to be stored in each of a plurality of information storage areas based on a reference value determined for each information storage area, each information storage area relating to a user or user group; an acquisition section that acquires relevant information about the stored document files stored in each of the information storage areas, the relevant information indicating user access; and a change section that changes the reference value determined for each of the information storage areas based on the user access indicated in the acquired relevant information, wherein the restriction section increases or decreases the information storage areas based on the reference value changed by the change section; wherein the relevant information includes information indicating when the stored document files are stored in the stored information area.

2. The information processing apparatus as claimed in claim 1, wherein the relevant information includes access information concerning access to the stored document files by a user.

3. The information processing apparatus as claimed in claim 2, wherein the access information includes history information which concerns an access history of the stored document files.

4. The information processing apparatus as claimed in claim 2, wherein the access information includes restriction information which concerns authorization to the stored document files.

5. The information processing apparatus as claimed in claim 1, wherein the change section determines the change amount of the reference value of one of the information storage areas based on the acquired relevant information for each information storage area.

6. A non-transitory computer readable medium storing a program causing a computer to execute a process for controlling an amount of information to be stored in each of a plurality of information storage areas, the process comprising: restricting a maximum amount of stored document files to be stored in each of the plurality of information storage areas based on a reference value determined for each information storage area, each information storage area relating to a user or user group; acquiring relevant information about the stored document files stored in each of the information storage areas, the relevant information indicating user access; and changing the reference value determined for each of the information storage areas based on the user access indicated in the acquired relevant information, wherein the restriction section increases or decreases the information storage areas based on the reference value changed by the change section; wherein the relevant information includes information indicating when the stored document files are stored in the stored information area.

7. The non-transitory computer readable medium as claimed in claim 6, wherein the relevant information includes access information concerning access to the stored document files by a user.

8. The non-transitory computer readable medium as claimed in claim 7, wherein the access information includes history information which concerns an access history of the stored document files.

9. The non-transitory computer readable medium as claimed in claim 7, wherein the access information includes restriction information which concerns authorization to the stored document files.

10. The non-transitory computer readable medium as claimed in claim 6, further comprising:
determining the change amount of the reference value of one of the information storage areas based on the acquired relevant information for each information storage area.

11. An information processing method comprising: restricting a maximum amount of stored document files to be stored in each of a plurality of information storage areas based on a reference value determined for each information storage area, each information storage area relating to a user or user group;
acquiring relevant information about the stored document files stored in each of the information storage areas, the relevant information indicating user access; and changing the reference value determined for each of the information storage areas based on the user access indicated in the acquired relevant information; wherein the restriction section increases or decreases the information storage areas based on the reference value changed by the change section; wherein the relevant information includes information indicating when the stored document files are stored in the stored information area.

12. The information processing method as claimed in claim 11,
wherein the relevant information includes access information concerning access to the stored document files by a user.

13. The information processing method as claimed in claim 12,
wherein the access information includes history information which concerns an access history of the stored document files.

14. The information processing method as claimed in claim 12, wherein the access information includes restriction information which concerns authorization to the stored document files.

15. The information processing method as claimed in claim 11, further comprising:
determining the change amount of the reference value of one of the information storage areas based on the acquired relevant information for each information storage area.

* * * * *